US006995319B2

(12) United States Patent
Ikeda

(10) Patent No.: US 6,995,319 B2
(45) Date of Patent: Feb. 7, 2006

(54) CORD END COVER

(75) Inventor: Yasuhiko Ikeda, Toyonaka (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 11/097,304

(22) Filed: Apr. 4, 2005

(65) Prior Publication Data

US 2005/0227528 A1 Oct. 13, 2005

(30) Foreign Application Priority Data

Apr. 8, 2004 (JP) .............................. 2004-114221

(51) Int. Cl.
*H02G 3/18* (2006.01)
(52) U.S. Cl. .................. 174/135; 174/65 SS; D13/184; 439/892
(58) Field of Classification Search ............... D13/133, D13/137.1, 138.1, 139.1, 153, 154, 156, 184; 174/35 R, 59, 65 G, 65 SS, 66, 68.3, 135, 174/138 R, 152 G, 153 G; 361/614, 730, 361/775; 439/121, 367, 736, 892
See application file for complete search history.

(56) References Cited

U.S. PATENT DOCUMENTS

| 4,323,725 | A | * | 4/1982 | Muller | 174/65 R |
| 5,164,546 | A | * | 11/1992 | Kumagai | 174/135 |
| 5,811,728 | A | * | 9/1998 | Maeda | 174/65 R |
| 5,892,177 | A | * | 4/1999 | Mazaris | 174/135 |
| 6,337,444 | B1 | * | 1/2002 | Liao | 174/135 |
| 6,481,765 | B1 | * | 11/2002 | Jelavic | 292/307 R |
| 6,639,146 | B1 | * | 10/2003 | Chiu | 174/65 R |
| 6,652,321 | B2 | * | 11/2003 | Liu | 174/135 |
| 6,656,185 | B2 | * | 12/2003 | Gleason et al. | 606/74 |
| 6,768,058 | B2 | * | 7/2004 | Pallapothu | 174/65 G |
| 6,833,508 | B2 | * | 12/2004 | Cha | 174/135 |
| D501,184 | S | * | 1/2005 | Ikeda | D13/156 |

FOREIGN PATENT DOCUMENTS

JP    H09-289906    11/1997

* cited by examiner

*Primary Examiner*—Dean A. Reichard
*Assistant Examiner*—Adolfo Nino
(74) *Attorney, Agent, or Firm*—Manabu Kanesaka

(57) ABSTRACT

A cord end cover includes a female member having a hollow shape with two open ends, and a male member having a leg part to be inserted into the female member from one open end of the female member, and a head part to be fitted into the one open end of the female member for covering the one open end at a final position of the insertion. A spike-like projection is formed on a side of the leg part of the male member along a direction of the insertion. When the leg part is inserted into the female member in a state in which the spike-like projection bites an end of a cord inserted into the female member from the other open end of the female member and drawn out from the one open end, the end of the cord is held between the spike-like projection and an inner surface of the female member.

7 Claims, 17 Drawing Sheets

CORD END COVER

BACKGROUND OF THE INVENTION AND RELATED ART STATEMENT

The invention relates to an end cover attached to an end of a cord in various kinds of products for making it easy to grasp the end of the cord, for preventing the end from being frayed, and for bundling ends of two cords.

There is an end cover comprising a female member 100 having a cylindrical shape and a male member 200. The male member 200 has a leg part 201 to be inserted into the female member 100 from one cylinder end of the female member 100 on one surface of a head part 202. The head part 202 is fitted into one cylinder end of the female member 100 at a position where the leg part 201 is completely inserted into the female member 100, so that the male member 200 is combined onto the female member 100. Ends W of cords are held between spike-like projections 203 on the leg part 201 of the male member 200 and an inner wall surface of the female member 100, so that the spike-like projections 203 bite into the ends W of the cords (see FIG. 25, refer to Patent Document 1).

In the end cover, when the end cover is attached to the ends W of the cords, it is necessary to insert the leg part 201 of the male member 200 into the female member 100 while maintaining a state in which the spike-like projections 203 of the male member 200 are pushed against the ends W of the cords inserted into the female member 100 from the other cylinder end of the female member 100 and drawn out from the one cylinder end, thereby making it difficult to attach the end cover to the ends W of the cords.

Patent Document 1: Japanese Design Registration No. 1195611.

In view of the problems described above, an object of the invention is to provide a cord end cover to be easily attached to an end of a cord.

Further objects and advantages of the invention will be apparent from the following description of the invention.

SUMMARY OF THE INVENTION

In order to attain the objects described above, according to the invention, a cord end cover includes a female member having a cylindrical shape with two open cylinder ends and a male member having a leg part to be inserted into the female member from one cylinder end of the female member. The male member has a head part to be fitted into the one cylinder end of the female member for covering the one cylinder end at a final position of the insertion. A spike-like projection is formed on a side of the leg part of the male member along a direction of the insertion. When the leg part is inserted into the female member in a state in which the spike-like projection bites an end of a cord inserted into the female member from the other cylinder end of the female member and drawn out from the one cylinder end, the end of the cord is held between the spike-like projection and an inner surface of the female member.

The spike-like projection of the male member is formed between a pair of holding plate parts for receiving the end of the cord between inner surfaces of the plates from a side of the leg part. The cord end is inserted into the female member from the other cylinder end of the female member and drawn out from the one cylinder end of the female member. Then, the drawn out cord end is inserted between the pair of holding plate parts of the male member from a side, so that the spike-like projection bites the cord end. Accordingly, it is possible to combine the cord end and the male member while maintaining a state that the spike-like projection bites the cord end. When the leg part of the male member is inserted into the female member, the cord end is held between the inner surface of the female member and the spike-like projection, and the spike-like projection firmly bites or is pierced the cord end. Accordingly, in a state that the head part of the male member is fitted into the one cylinder end of the female member, the female member and the male member cover the cord end, and the end cover is attached to the cord end.

According to the present invention, the spike-like projection and the pair of holding plate parts may be formed on both sides of the leg part of the male member. With this structure, ends of two cords are inserted into the female member and drawn out. One end of the drawn out two cords is inserted between the holding plate parts formed on one side of the leg part of the male member, and the other end of the drawn out two cords is inserted between the holding plate parts formed on the other side of the leg part of the male member. Then, the leg part of the male member holding the ends of the two cords is inserted into the female member. Accordingly, it is possible to easily attached the end cover to the ends of the two cords.

According to the present invention, a rib-like part is formed inside the female member for entering between the pair of holding plate parts of the leg part of the male member when the leg part is inserted into the female member. A projecting end surface of the rib-like part becomes the inner surface for tightening. With this structure, after the cord end drawn out from the female member is inserted between the pair of holding plate parts, the leg part of the male member is inserted into the female member. In this state, the rib-like part can enter between the pair of holding plate parts from a front end side of the leg part, so that the spike-like projection can firmly bites the cord end with the rib-like part.

According to the present invention, at least a part of the projecting end surface of the rib-like part of the female member is formed in an inclined surface inclined such that a projection of the rib-like part gradually becomes larger toward the other cylinder end of the female member. Further, a part of the leg part of the male member becomes a spring-like part capable of elastic deformation in a direction that a location of the spike-like projection moves away from the head part. With this structure, after the cord end drawn out from the female member is inserted between the pair of holding plate parts, the leg part of the male member is inserted into the female member. IN this state, the rib-like part can enter between the pair of holding plate parts from the front end side of the leg part smoothly while gradually increasing a pressing force on the cord end.

Further, after the end cover is attached on the cord end, in a case that the cord is pulled in a direction of being drawn out from the other cylinder end of the female member, the spring-like part is elastically deformed so that the location of the spike-like projection moves toward the other cylinder end of the female member. Accordingly, a pitch between a tip of the spike-like projection and the inner surface gradually becomes narrower as the spike-like projection moves toward the other cylinder end with the inclined surface. As a result, the spike-like projection can bite the cord end firmly as such tension is further applied.

Further, in a case that a thick cord end is drawn out from the female member and inserted between the pair of holding plate parts, when the cord end contacts the inner surface upon the insertion of the leg part of the male member into the female member, the spring-like part is elastically deformed, so that the spike-like projection moves toward the one cylinder end of the female member. Accordingly, even for a thick cord end, the end cover can be attached suitably on the cord end.

According to the present invention, the spring-like part of the leg part of the male member may be disposed between the spike-like projection and the head. One end of the spring-like part is integrated with the spike-like projection, and the other end is integrated with the head part. A middle part of the spring-like part is formed of one side bent piece and the other side bent piece. The one side bent piece is bent with an axis center line of the leg part as an inside of the bending. The other side bent piece has-a linear symmetrical shape relative to the one side bent piece relative to a center line of the leg part.

With this structure, the spring-like part elastically deforms uniformly on both sides of the leg part, that is, both sides of the center line of the leg part. The location of the spike-like projection can moves straight, that is, without moving toward either side, to the other cylinder end or the one cylinder end of the female member by the deformation of the spring-like part. Accordingly, the spike-like projection bites the cord end stably.

In the end cover of the invention, the end of the cord drawn out through the female member is held between the pair of holding plate parts formed on the leg shaft of the male member. Accordingly, it is possible to maintain the state in which the spike-like projection formed between the pair of holding plate parts firmly bites the cord end. Then, the leg part of the male member is inserted into the female member, or the cord extending out from the other cylinder end of the female member is pulled. Accordingly, it is possible to combine the male member and the female member holding the cord end between the inner surface of the female member and the spike-like projection. It is possible to easily attach the end cover on the cord end.

DETAILED DESCRIPTION OF PREFERRED EMBODIMENTS

Figure 1:
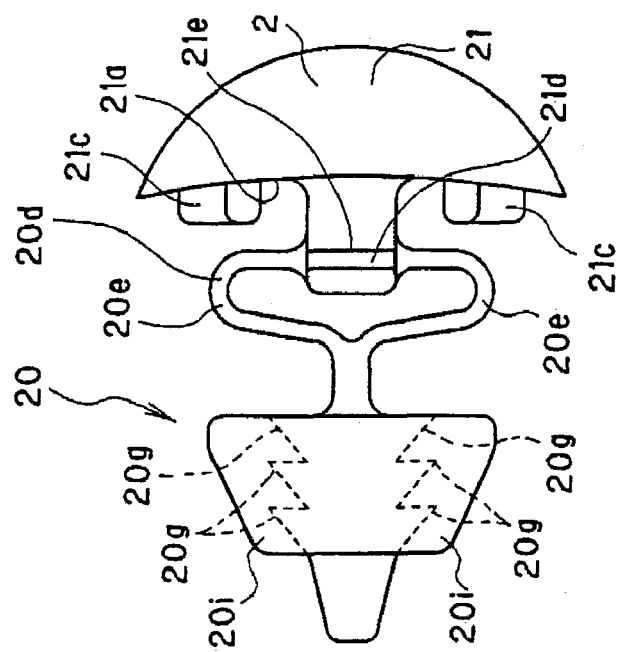
FIG. 1 is a partial sectional front view showing a process of attaching an end cover to cord ends according to an embodiment of the present invention.
Figure 1:
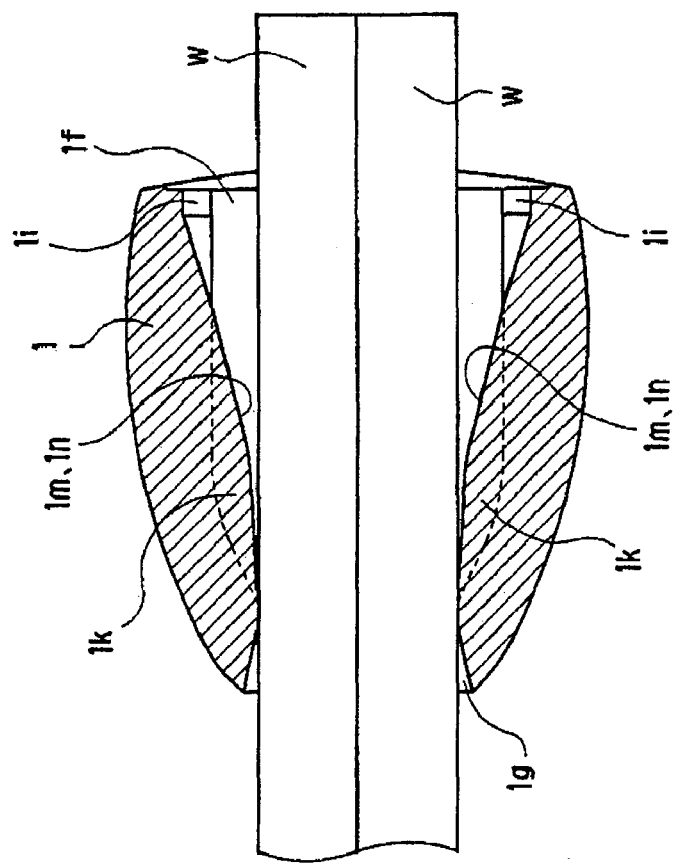
Figure 2:
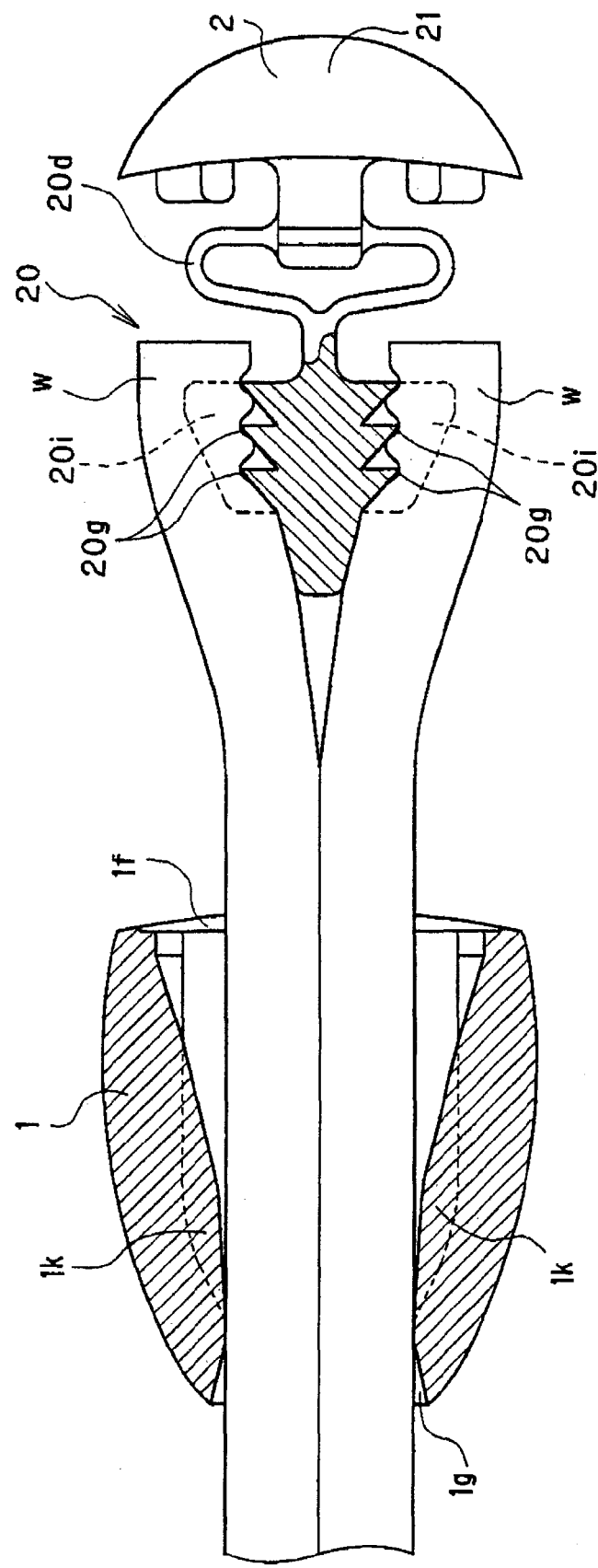
FIG. 2 is a partial sectional front view showing the process of attaching the end cover to the cord ends.
Figure 3:
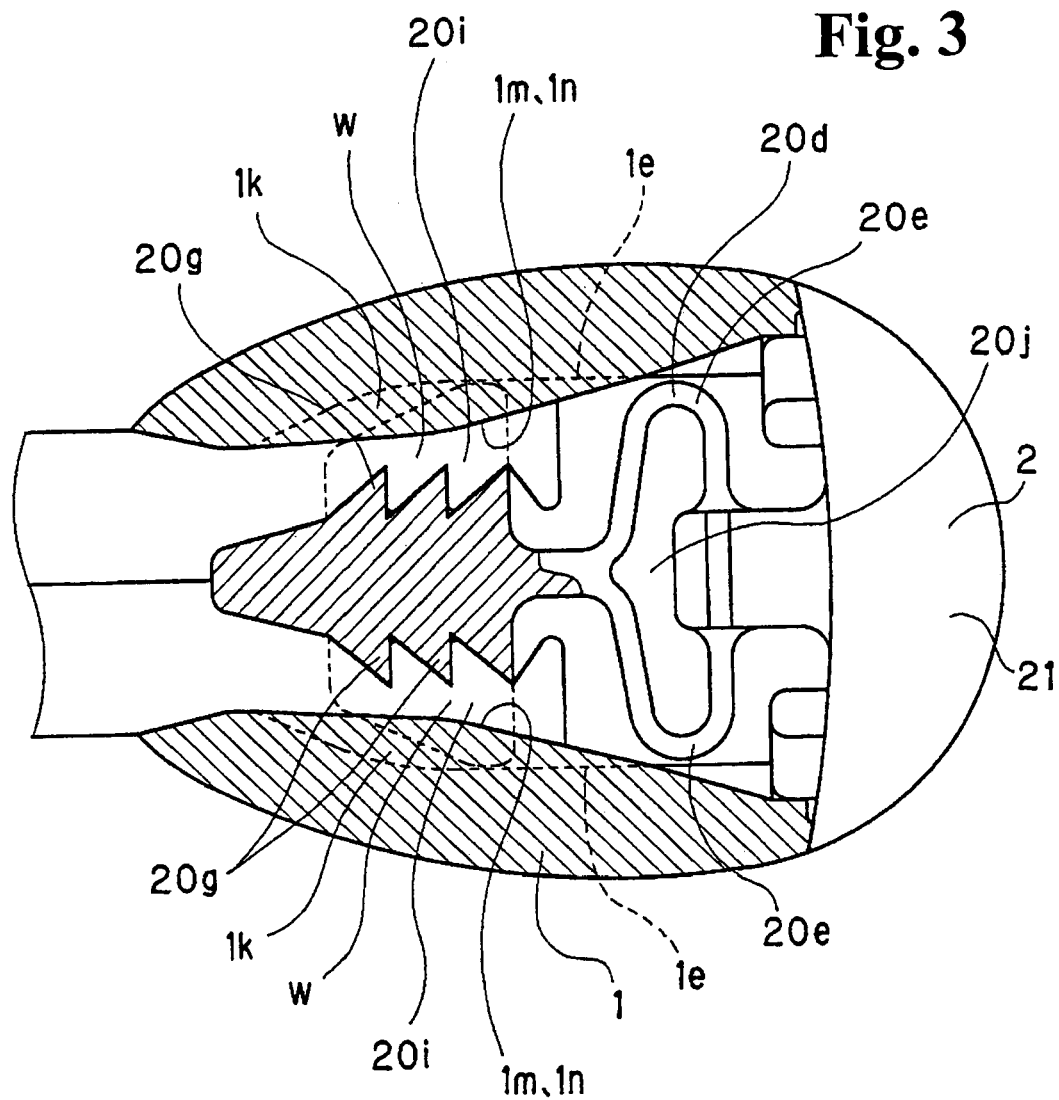
FIG. 3 is a partial sectional front view showing the process of attaching the end cover to the cord ends.
Figure 4:
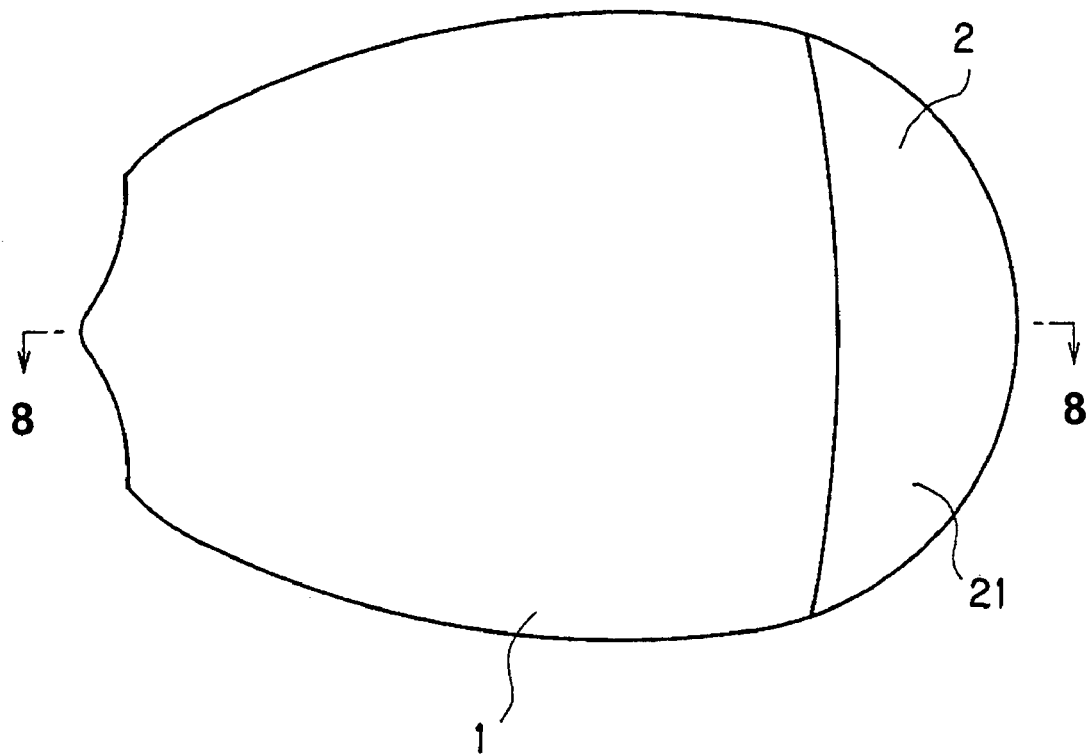
FIG. 4 is a front view of the end cover.
Figure 5:
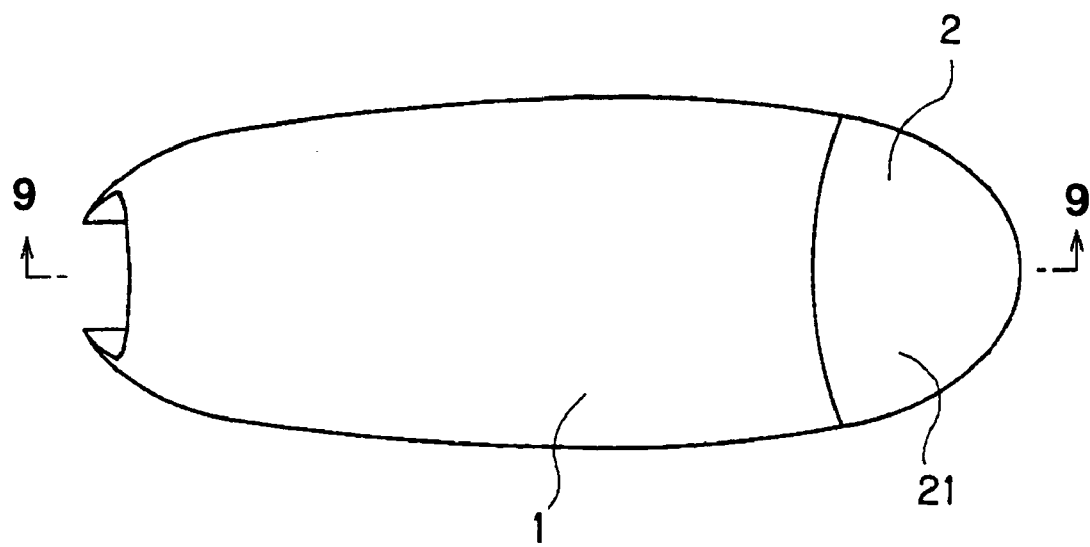
FIG. 5 is a plan view of the end cover.
Figure 6:
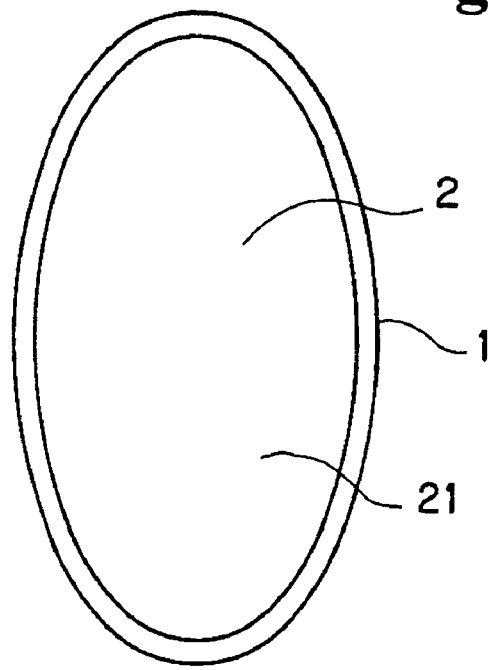
FIG. 6 is a right side view of the end cover.
Figure 7:
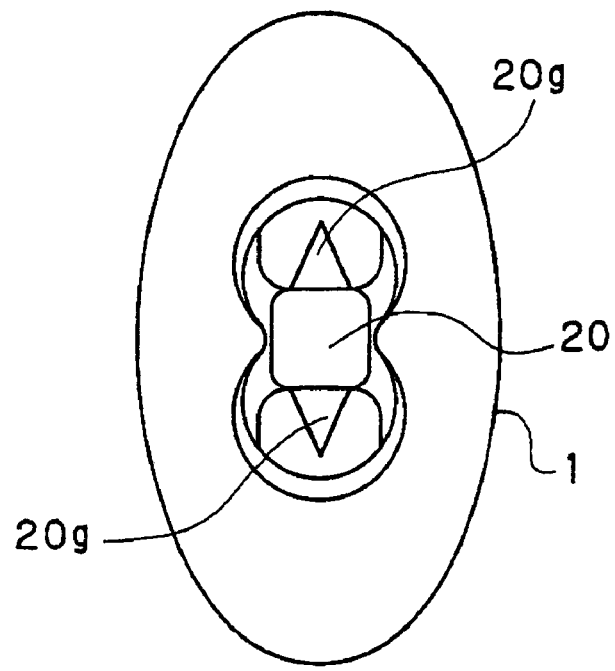
FIG. 7 is a left side view of the end cover.
Figure 8:
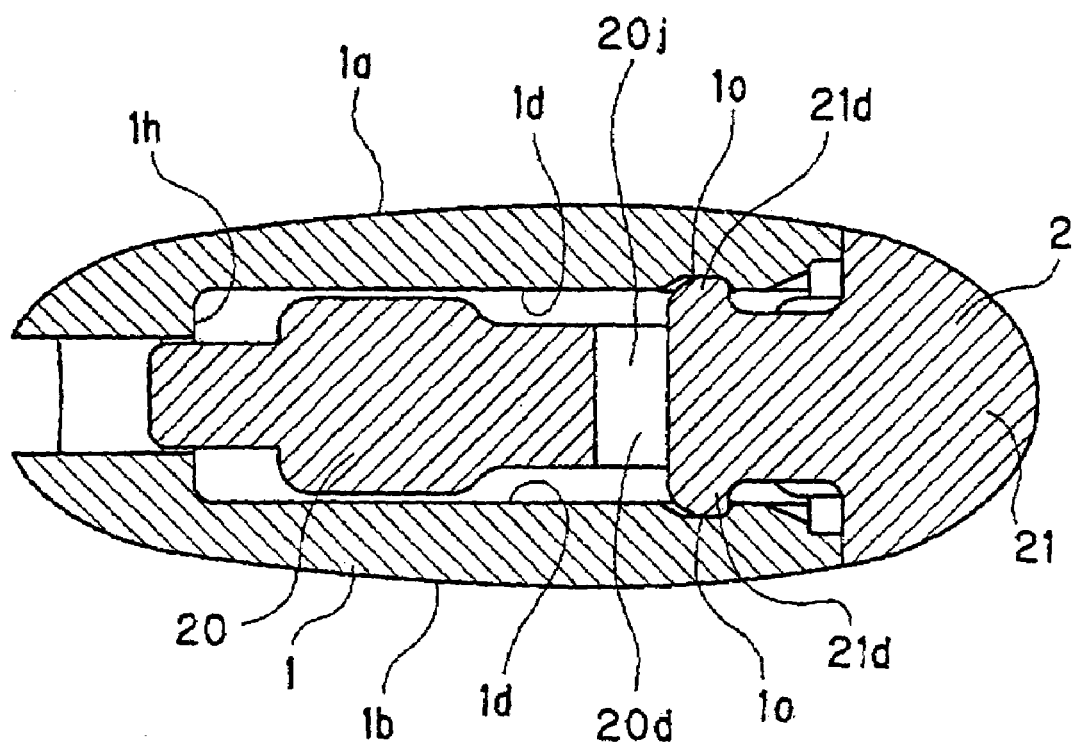
FIG. 8 is a sectional view taken along line 8—8 in FIG. 4.
Figure 9:
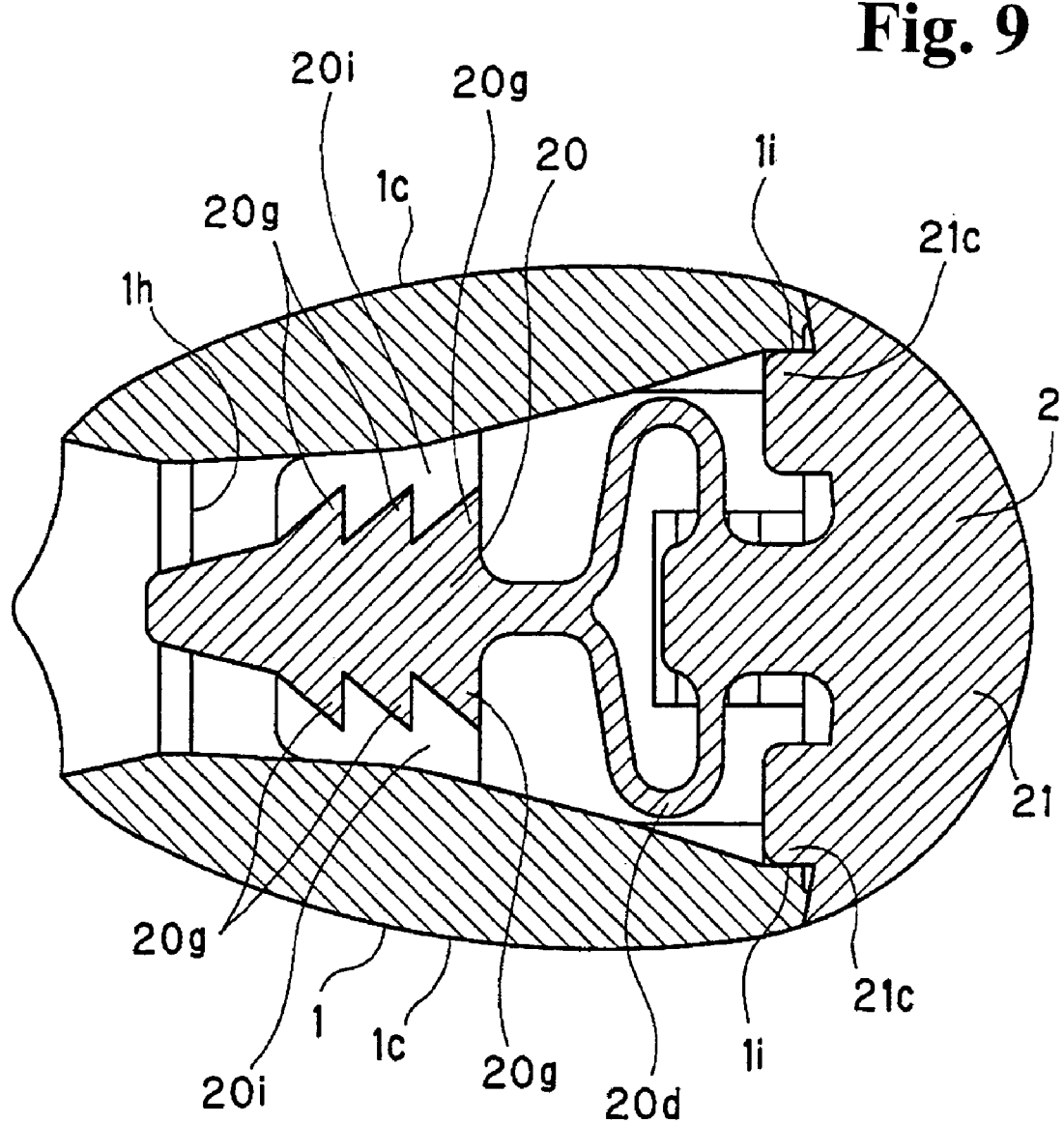
FIG. 9 is a sectional view taken along line 9—9 in FIG. 5.
Figure 10:
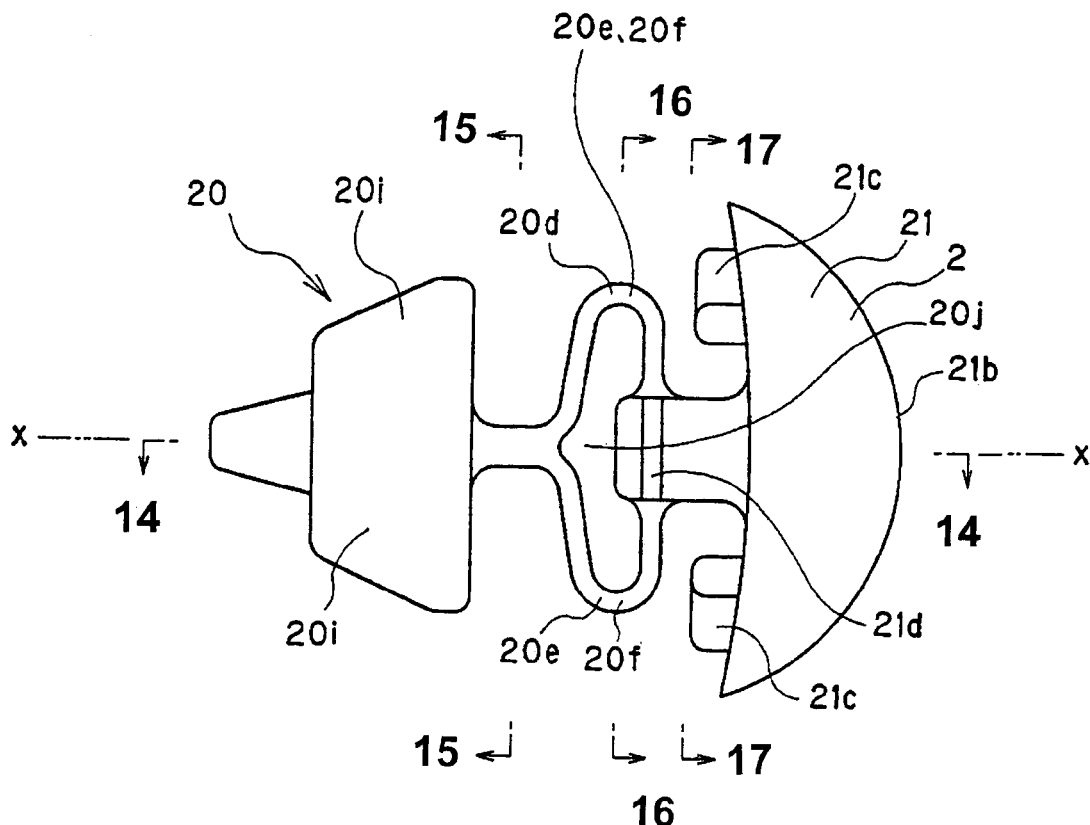
FIG. 10 is a front view of a male member.
Figure 11:
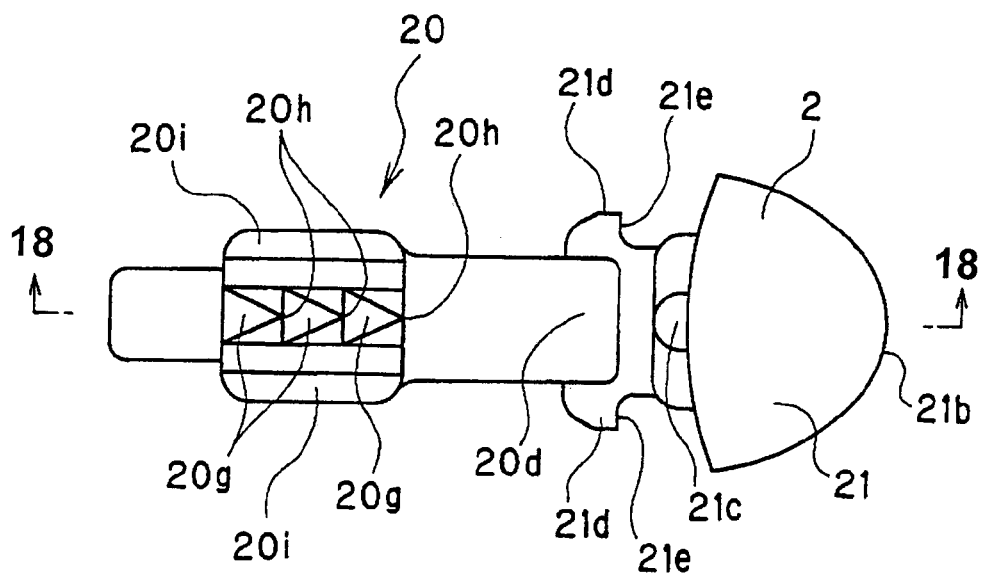
FIG. 11 is a plan view of the male member.
Figure 12:
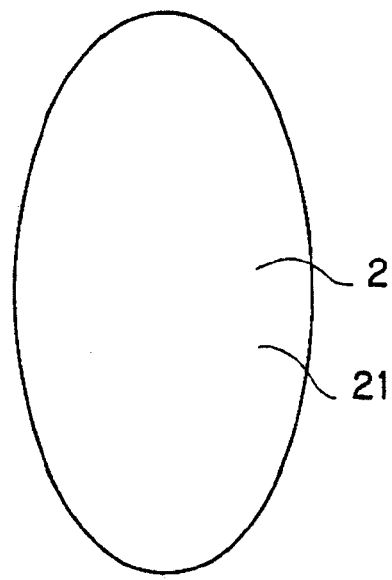
FIG. 12 is a right side view of the male member.
Figure 13:
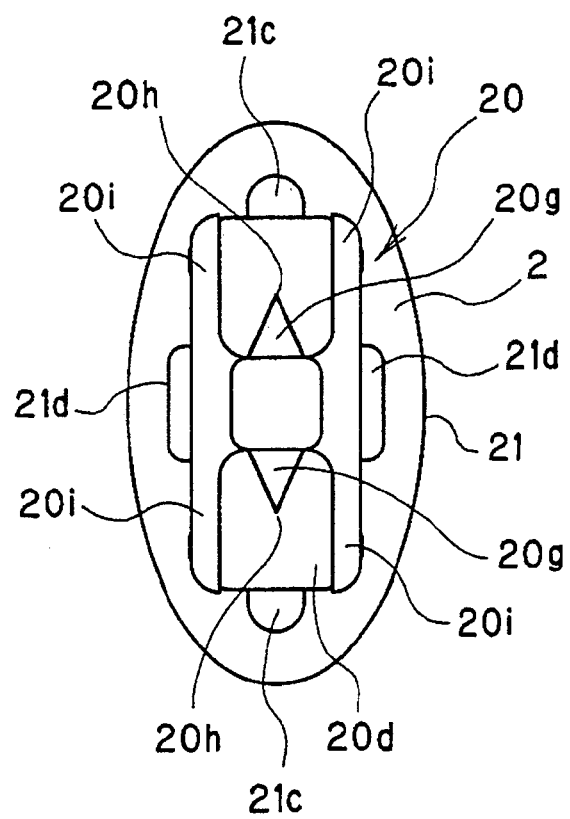
FIG. 13 is a left side view of the male member.
Figure 14:
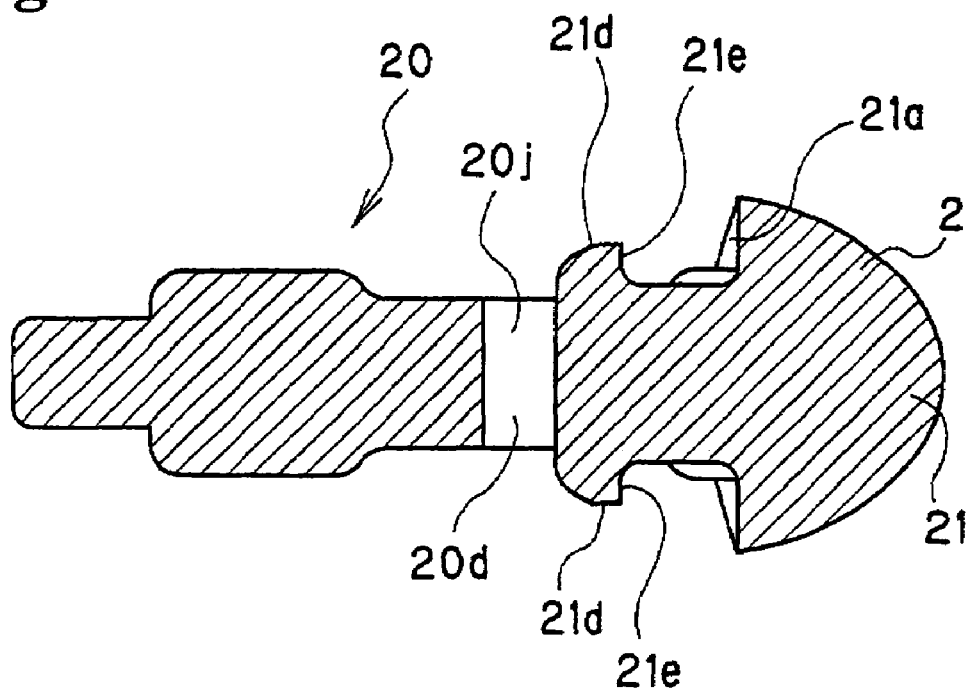
FIG. 14 is a sectional view taken along line 14—14 in FIG. 10.
Figure 15:
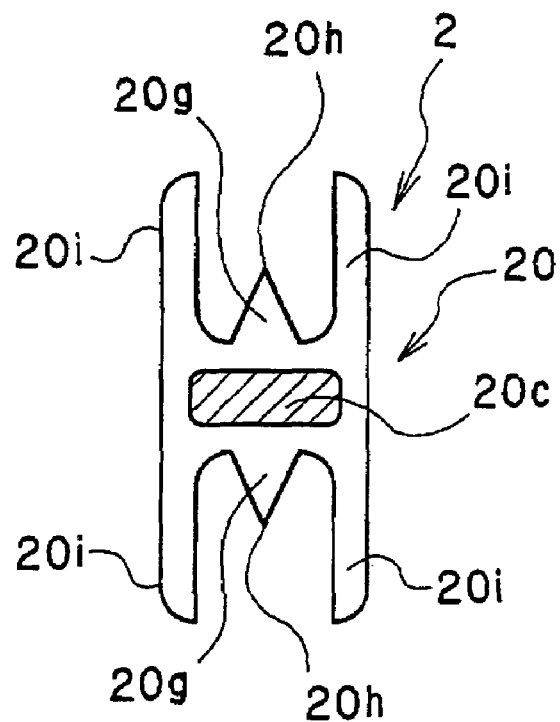
FIG. 15 is a sectional view taken along line 15—15 in FIG. 10.
Figure 16:
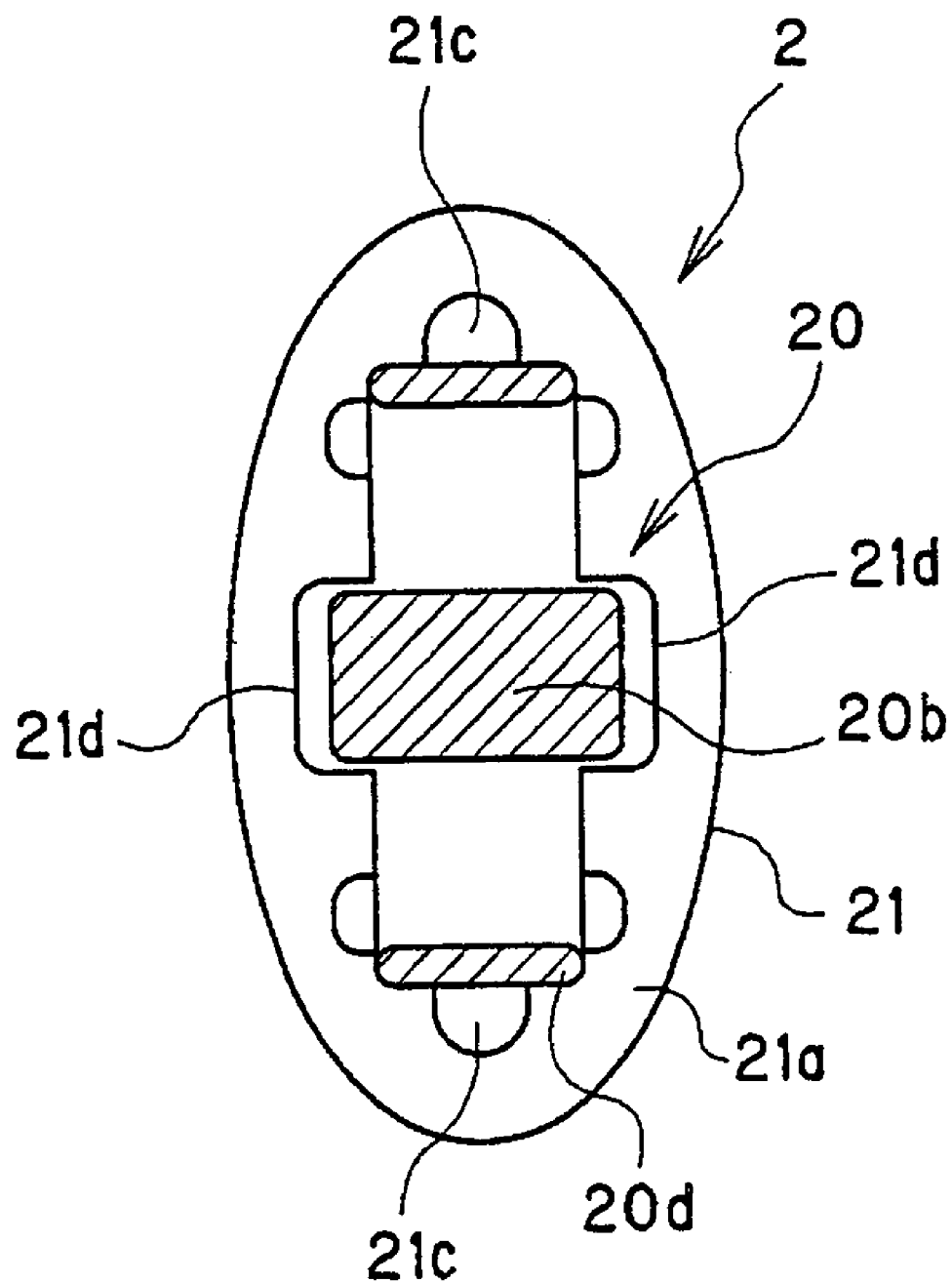
FIG. 16 is a sectional view taken along line 16—16 in FIG. 10.
Figure 17:
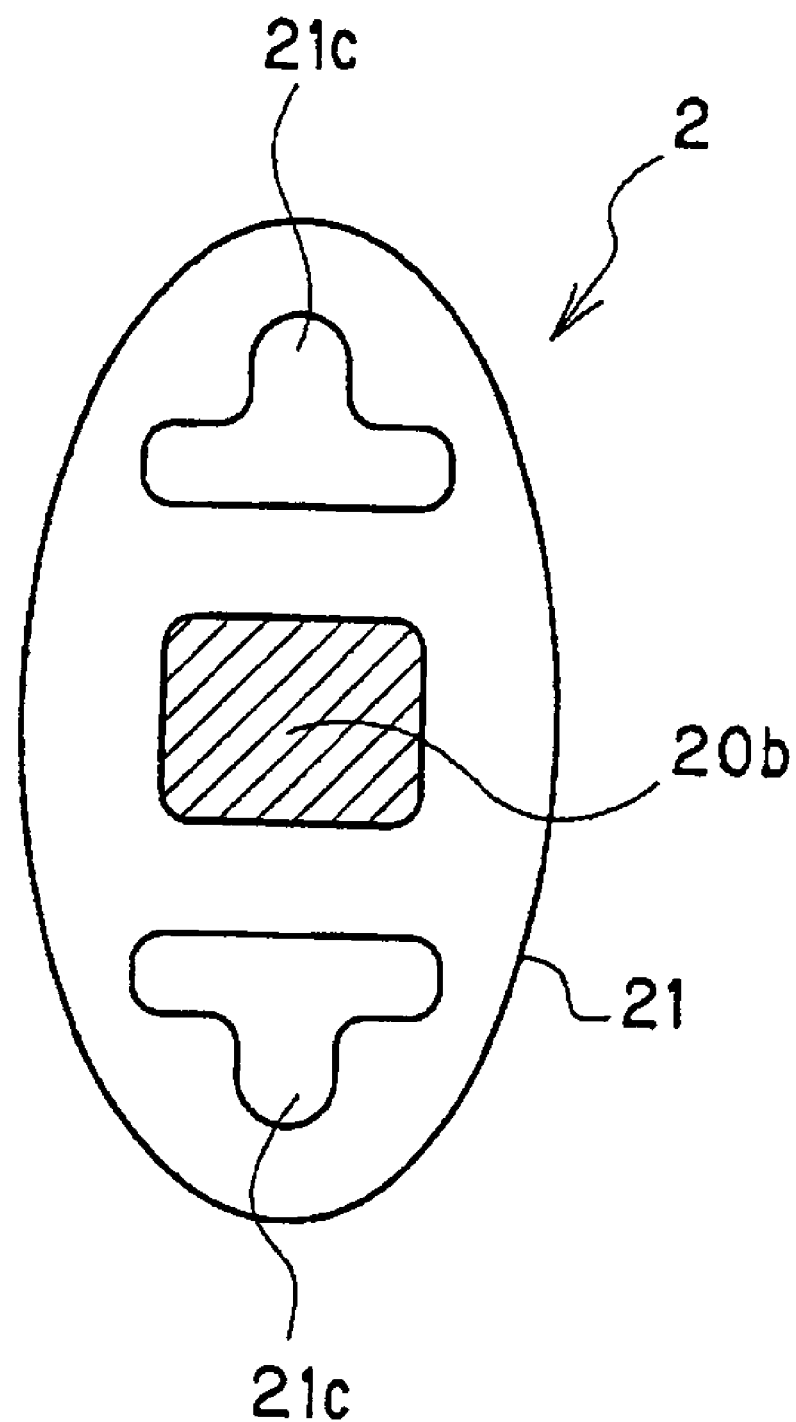
FIG. 17 is a sectional view taken along line 17—17 in FIG. 10.
Figure 18:
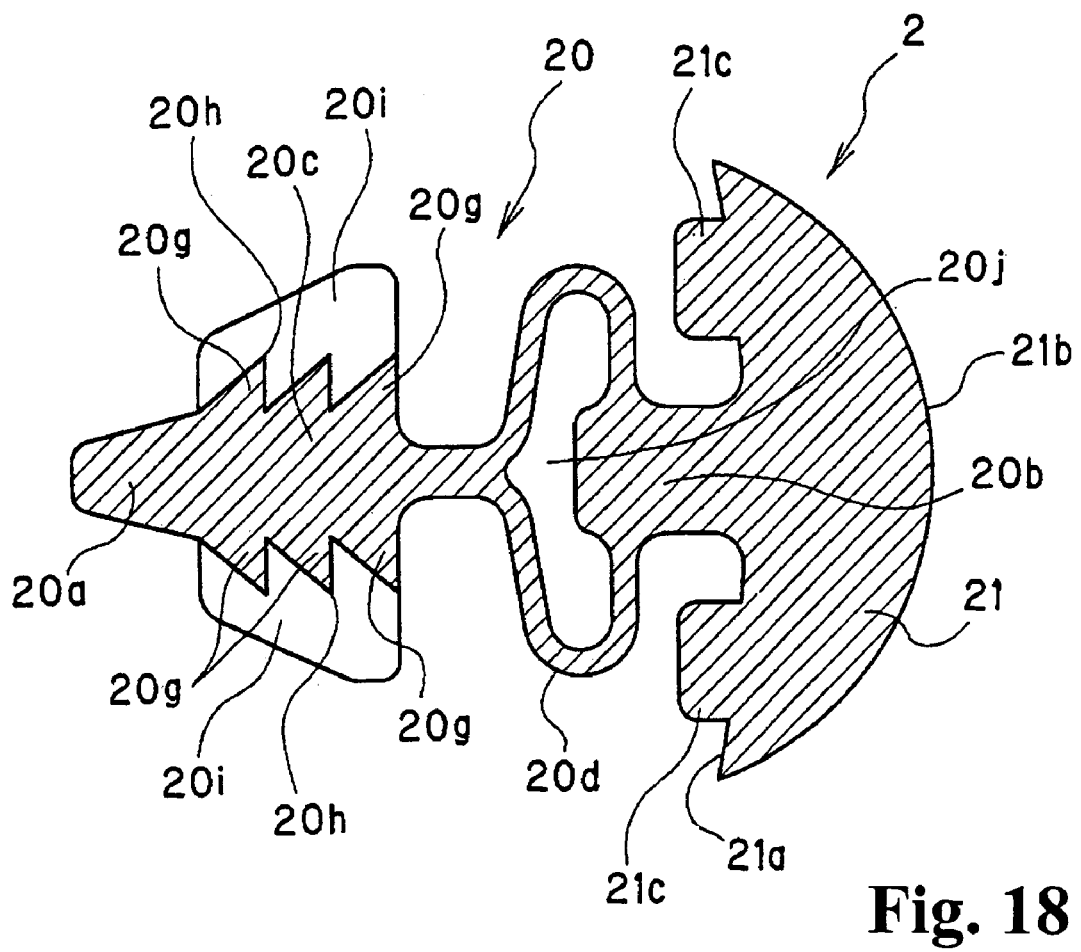
FIG. 18 is a sectional view taken along line 18—18 in FIG. 11.
Figure 19:
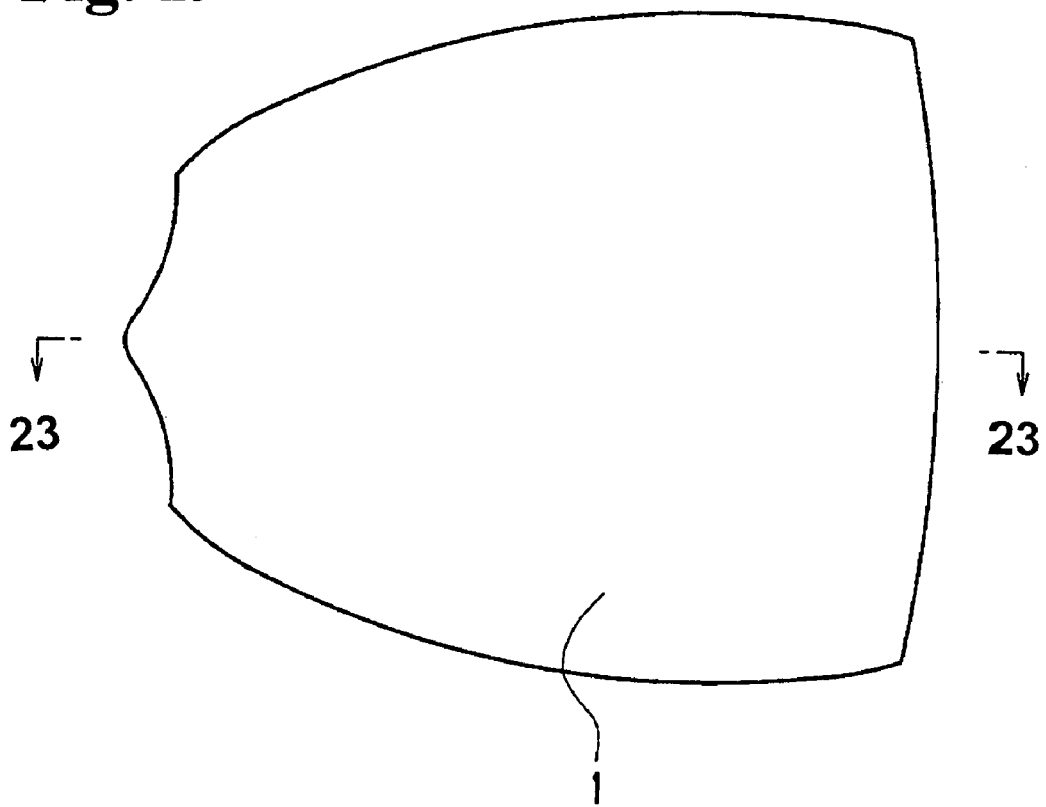
FIG. 19 is a front view of a female member.
Figure 20:
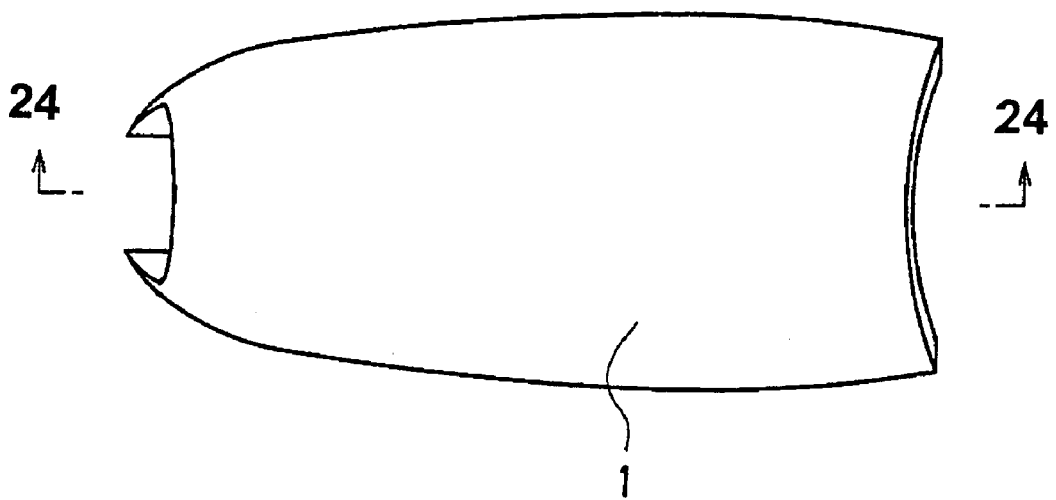
FIG. 20 is a plan view of the female member.
Figure 21:
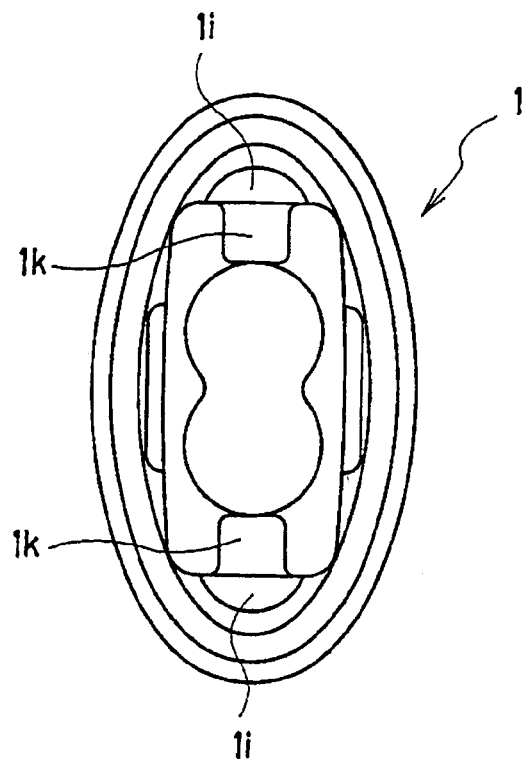
FIG. 21 is a right side view of the female member.
Figure 22:
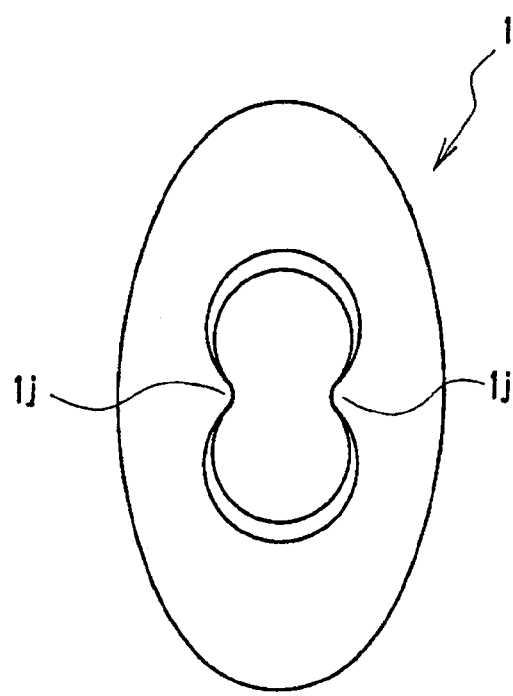
FIG. 22 is a left side view of the female member.
Figure 23:
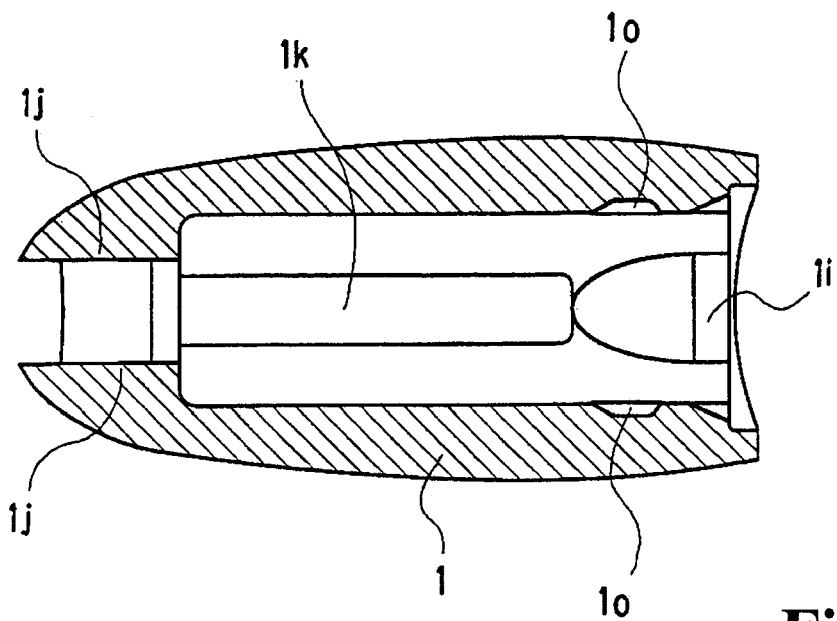
FIG. 23 is a sectional view taken along line 23—23 in FIG. 19.
Figure 24:
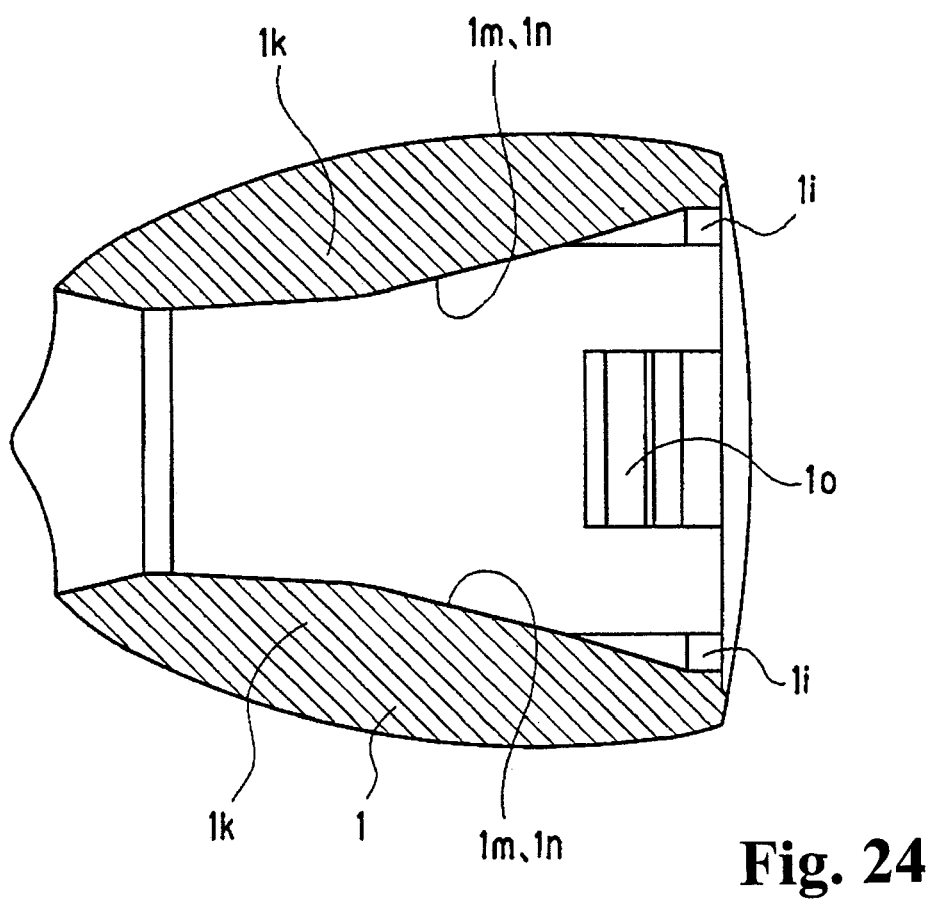
FIG. 24 is a sectional view taken along line 24—24 in FIG. 20.
Figure 25:
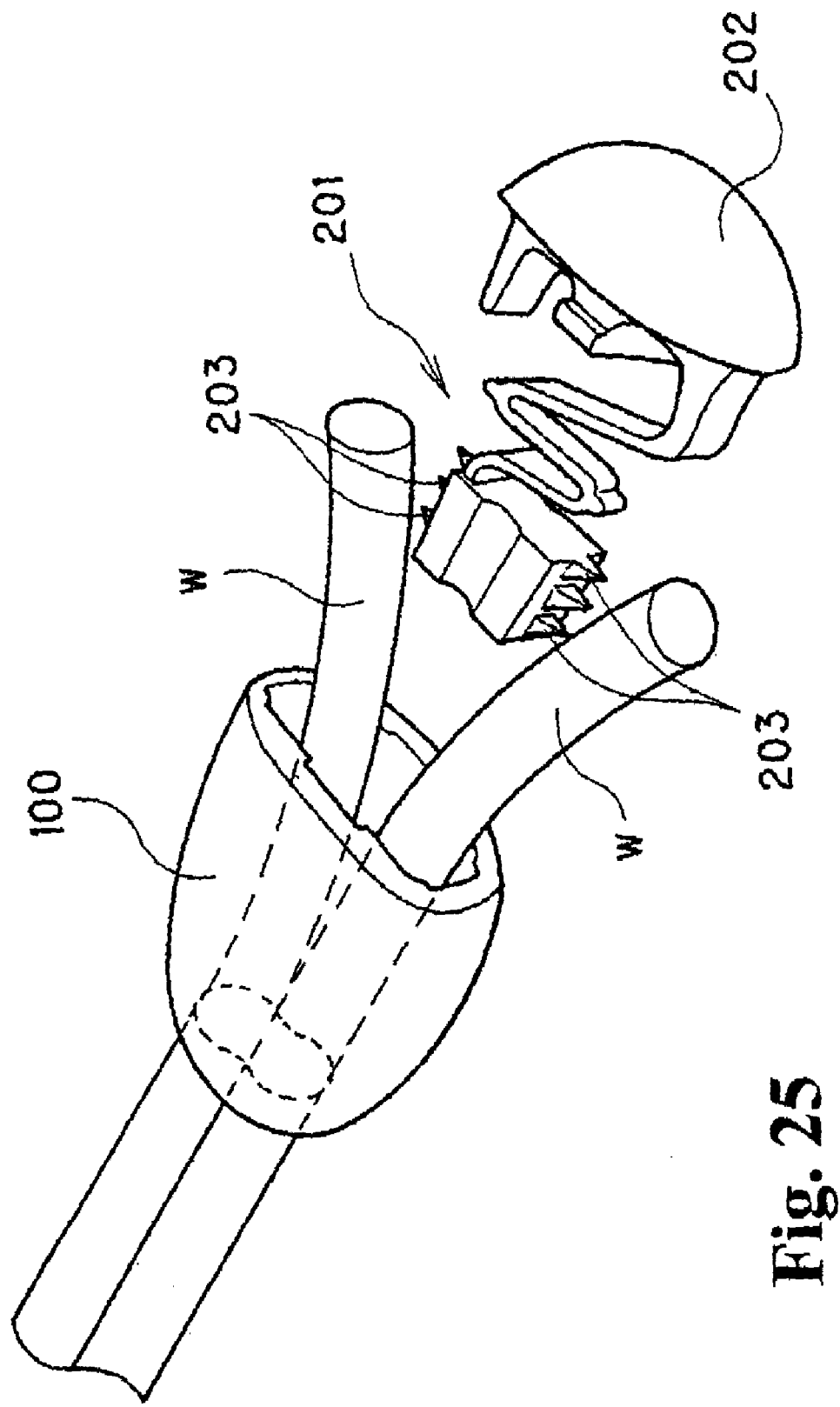
FIG. 25 is a perspective view showing a conventional cord end.

Hereunder, embodiments of the invention will be explained with reference to FIG. 1 through FIG. 24. FIG. 1 shows a state in which cord ends W are passed through a female member 1 constituting an end cover separated from a male member 2. FIG. 2 shows a state in which the cord ends W are inserted between a pair of holding plate parts 20$i$ on a leg part of the male member 2. FIG. 3 shows a state in which the leg part 20 of the male member 2 is inserted into the female member 1 from the state in FIG. 2, so that the male member 2 and the female member 1 are combined to form an end cover attached on the cord ends W. FIG. 4 through FIG. 9 shows the end cover, FIG. 10 through FIG. 18 show the male member 2, and FIG. 19 through FIG. 24 show the female member 1.

In the embodiment, the cord end cover is attached to the ends of pulling cords, choking cords, tightening cords, and the like, which are provided on various kinds of products, to make the ends W of the cords easier to grasp, to make it such that the ends W of the cords do not unravel, to collect the ends W, W of two cords with the end cover, and the like. As such cords, round cords, flat cords, synthetic resin cords, and the like, are expected. Such end cover is constituted by the female member 1 and the male member 2.

The female member 1 is constituted so as to have a cylindrical shape opening at both cylinder ends. In the embodiment, the female member 1 is constituted so as to have a flat cylindrical shape. That is, the female member 1 has a front surface 1$a$ and a back surface 1$b$ having wide width, and in addition, it has two side surfaces 1$c$ having narrow width. The female member 1 is constituted such that the shape of the outer contour in section in the direction orthogonal to its cylinder axis is roughly elliptical in all positions. Also, inside the female member 1, a pair of inside surfaces 1$d$ having wide width and a pair of inside surfaces 1$e$ having narrow width are formed.

On opening 1$f$ at one cylinder end of the female member 1 is constituted so as to be larger than an opening 1$g$ at the other cylinder end. The inner diameter on the side of the opening 1$g$ at the other cylinder end of the female member 1 is constricted, whereby a step surface 1$h$ facing the side of the one cylinder end is formed on the side of the opening 1$g$ at the other cylinder end. The shape of the inner contour of the female member 1, from the one cylinder end to the step surface 1$h$, is constituted mainly the pair of inside surfaces 1$d$ having wide width and the pair of inside surfaces 1$e$ having narrow width, being mutually parallel. From the step surface 1$h$ to the other cylinder end, the shape of the inner contour is two circles arranged in parallel by projecting parts 1$j$ which project to the inside of the ellipse from positions near the center in the long-axial direction of the ellipse. The two circles are connected together in the positions of formation of the projecting parts.

In the embodiment, it is made such that one end W of two round cords is inserted so as to be positioned on one side of the two circles, and the other end W of the two round cords is inserted so as to be positioned on the other side of the two circles, from the opening on the other cylinder end of the female member 1. Also, from the step surface 1h to the other cylinder end of the female member 1, it is made such that the inner diameter gradually becomes narrower toward the step surface 1h, so that it is made easier to insert the cord ends W into the female member 1 from the opening on the other cylinder end of the female member 1.

The male member 2 has a leg part 20 inserted into the female member 1 from the one cylinder end of the female member 1, and a head part 21 fitted into the one cylinder end of the female member 1 and blocks the one cylinder end at a final position of the insertion.

In the embodiment, the head part 21 has an outer contour shape following the outer contour shape in section of the female member 1. That is, the head part 21 is constituted such that the outer contour shape in section in the direction orthogonal to the center line following the direction of insertion of the female member 2 is made as an elliptical shape. The head part 21 is constituted such that the sectional shape is made smaller gradually toward the top end 21b of the head part 21 from a blocking surface 21a with a size matching to the one cylinder end of the female member 1, and it is constituted so as to have a dome-like appearance.

The leg part 20 of the male member 2 has a bar-shaped front end part 20a and a bar shaped base part 20b. The leg part 20 also has spike-like projections 20g and holding plate parts 20i (described later) in the middle part 20c of a front end part 20a, and has a spring-like part 20d (described later) between the front end part 20a and the base part 20b. One end of the base part 20b is integrally connected in about the middle part of the blocking surface 21a of said head part 21.

The spike-like projections 20g are formed on the side of the leg part 20 of the male member 2 following the direction of insertion. By inserting the leg part 20 into the female member 1 in a state in which the spike-like-projections 20g are caused to stab the end W of the cord inserted into the female member 1 from the other cylinder end of the female member 1 and drawn out from the one cylinder end, it is made so as to be fixed onto the end W of the cord in a manner such that the end W of the cord is grasped between the spike-like projections 20g and an inner surface for tightening 1m of the female member.

The spike-like projections 20g of the male member 2 are formed between a pair of holding plate parts 20i formed so as to be capable of receiving the end W of the cord between the inner surfaces of the plates from the side of the leg part 20.

In the embodiment, the spike-like projections 20g are formed on the leg part 20 of the male member 2 such that the tips 20h are oriented toward the inside surfaces 1e having narrow width of the female member 1. Three spike-like projections 20g are formed on each side of the leg part 20 oriented toward the inside surfaces 1e having narrow width of the female member 1 with spaces between adjacent spike-like projections 20g opened in the direction of insertion of the leg part 20. All of the spike-like projections 20g are constituted having a rectangular shape in section in the direction orthogonal to the direction of projection, and the section becomes smaller toward the tip 20h so that the tip 20h is sharply pointed. All of the spike-like projections 20g have the surface oriented toward the head part 21 of the male member 2 made as a surface in a direction roughly orthogonal to the direction of insertion of the leg part 20, while the opposite surface is made as a surface inclined in the direction of approaching the side of the head part 21 toward the tip 20h. Accordingly, when tension in the direction of drawing out from the other cylinder end of the female member 1 is applied to the cord stabbed by the spike-like projections 20g and firmly stabbed or pierced by the spike-like projections 20g by the clamping by insertion of the leg part 20 into the female member 1 as previously noted, the spike-like projections 20g bite into the cord so as to effectively counter the tension.

The spike-like projections 20g of the male member 2 are formed between the pair of holding plate parts 20i projecting in the same direction as the direction of projection of the spike-like projections 20g with one side integrally connected to the front end part 20a of the leg part 20 of the male member 2. In the embodiment, the other sides of the holding plate parts 20i are positioned further forward from the tips 20h of the spike-like projections 20g. Also, the holding plate parts 20i are constituted such that the plate width is widened gradually toward the head part 21 of the male member 2, and the other sides of the holding plate parts 20i become inclined sides.

In the embodiment:

(1) A distance between the outer surfaces of the pair of holding plate parts 20i is somewhat smaller than a distance between the inner surfaces of the inside surfaces 1d having wide width of the female member 1.

(2) Insertion cavities 1i are formed on the inside surfaces 1e having narrow width in the opening on one cylinder end of the female member 1. Bumps 21c formed on both sides of the blocking part 21a of the head part 21 of the male member 2 sandwiching both sides of the base part 20b of the leg part 20 are fitted in the insertion cavities 1i at the position where the leg part 20 of the male member 2 is completely inserted into the female member 1.

(3) Coupling bumps 21d having coupling surfaces 21e facing the head part 21 are formed respectively on the sides of the base part 20b of the leg part 20 of the male member 2 facing the inside surfaces 1d having wide width of the female member 1.

(4) By inserting the leg part 20 of the male member 2 into the female member 1, the coupling bumps 21d are pushed against the inside surfaces 1d having wide width near the opening 1f on the one cylinder end of the female member 1 and press the opening 1f on the one cylinder end somewhat wider elastically. Then, at the position where the leg part 20 of the male member 2 is completely inserted into the female member 1, the coupling bumps 21d are inserted and coupled into coupling recesses 1o formed inside the female member 1 by springing back of the side of the female member 1.

By inserting the cord end W into the female member 1 from the other cylinder end of the female member 1 and drawing it out from the one cylinder end of the female member 1, and then inserting the drawn out cord end W between the pair of holding plate parts 20i of the male member 2 from the side and also causing the spike-like projections 20g to stab the cord end W, the cord end W and the male member 2 can be combined while maintaining the stabbing state of the spike-like projections 20g. Then, by inserting the leg part 20 of the male member 2 into the female member 1, the end cover can be equipped onto the cord end W so as to cover the cord end W by the female member 1 and the male member 2, which are combined with the head part 21 of the male member 2 fitted into the one cylinder end of the female member 1, while holding the cord end W between the inner surface for tightening 1m of the female member 1 and the spike-like projections 20g to cause the spike-like projections 20g to firmly stab or pierce the cord end W.

In the embodiment, the spike-like projections 20g and the pair of holding plate parts 20i for holding together with the spike-like projections 20g are formed respectively on both sides of the leg part 20 of the male member 2.

Accordingly, the end cover can be equipped easily and suitably on the ends W of two cords by inserting the ends W of two cords together into the female member 1 and drawing them out (FIG. 1), then inserting one end W of the drawn out two cords between the holding plate parts 20i formed on one side of the leg part 20 of the male member 2 and inserting the other end W of the drawn out two cords between the holding plate parts 20i formed on the other side of the leg part 20 of the male member 2 (FIG. 2), and next inserting the leg part 20 of the male member 2 having the ends W of the two cords thus combined into the female member 1 (FIG. 3).

In the embodiment, a rib-like part 1k entering between the pair of holding plate parts 20i of the leg part 20 of the male member 2 accompanying insertion of the leg part 20 into the female member 1 is formed on the inside of the female member 1. In addition, the projecting end surface of the rib-like part 1k becomes the inner surface for tightening 1m.

Concretely, in the embodiment, the rib-like parts 1k are formed respectively on the pair of inside surfaces 1e having narrow width of the female member 1, in a condition having spaces opened between the inside surfaces 1d having wide width of the female member 1 and the side surfaces of the rib-like parts 1k. In the embodiment, each rib-like part 1k is formed so as to have a length spanning from somewhat forward of the insertion cavity 1i of the female member 1 to the step surface 1h.

Accordingly, in the embodiment, by inserting the cord end W drawn out from the female member 1 between the pair of holding plate parts 20i and then inserting the leg part 20 of the male member 2 into the female member 1, the rib-like part 1k can enter between the pair of holding plate parts 20i from the front end side of the leg part 20, and the spike-like projections 20g can firmly stab or pierce the cord end W by the inner surface for tightening 1m of the rib-like part 1k.

Also, in the embodiment, at least a part of the projecting end surface of the rib-like part 1k of the female member 1 is an inclined surface in inclined such that a length of projection of the rib-like part 1k gradually becomes larger toward the other cylinder end of the female member 1. In addition, a part of the leg part 20 of the male member 2 becomes a spring-like part 20d which enables elastic deformation in a direction moving the place of formation of the spike-like projections 20g away from the head part 21.

Concretely, in the embodiment, the projecting end of the rib-like part 1k, that is, the inner surface for tightening 1m, is the inclined surface 1n inclined such that the length of projection of the rib-like part 1k gradually becomes larger from the one cylinder end toward the other cylinder end of the female member 1.

Accordingly, in the embodiment, by inserting the cord end W drawn out from the female member 1 between the pair of holding plate parts 20i, and then inserting the leg part 20 of the male member 2 into the female member 1, the rib-like part 1k can enter between the pair of holding plate parts 20i from the front end side of the leg part 20 smoothly while gradually increasing the pressing force on the cord end W.

After the end cover is equipped on the cord end W, in the case that the cord is subject to tension in the direction of being drawn out from the other cylinder end of the female member 1, the spring-like part 20d is elastically deformed so that the place of formation of the spike-like projections 20g can be moved to the side of the other cylinder end of the female member 1. Because the pitch between the tips 20h of the spike-like parts thus moved and the inner surface for tightening 1m gradually becomes narrower as the place of formation is moved to the side of the other cylinder end by the sloping surface 1n, the spike-like projections 20g can stab or pierce the cord end W more firmly as such tension is further applied.

In the case that the cord end W drawn out from the female member 1 and inserted between the pair of holding plate parts 20i is comparatively thick, at the stage when contact of the cord end W to the inner surface for tightening 1m begins accompanying the insertion of the leg part 20 of the male member 2 into the female member 1 from the state, the spring-like part 20d is elastically deformed so that the place of formation of the spike-like parts can be moved to the side of the one cylinder end of the female member 1. Accordingly, even for a comparatively thick cord end W, the end cover can be equipped suitably on the cord end W.

In the embodiment, the spring-like part 20d of the leg part 20 of the male member 2 is between the place of formation of the spike-like projections 20g and the head 21, and is constituted by a bent piece 20e on one side and a bent piece 20e on the other side. One end of the piece is integrated in the place of formation of the spike-like projections 20g, the other end of the piece is integrated on the side of the head part 21, and the middle part 20f of the piece is bent having the side of the axis center line x of the leg part 20 on the inside of the bend. In addition, the spring-like part 20d of the leg part 20 of the male member 2 is constituted such that the bent piece 20e on the other side has a linear symmetrical shape to the bent piece 20e on one side based on the axis center line x of the leg part 20.

Concretely, in the embodiment, the bent piece 20e on one side and the bent piece 20e on the other side are provided in a manner such that one end of the piece is integrally connected to the end of the middle part 20c of the leg part 20 facing the head part 21 and the other end of the piece is integrally connected to the side of the end of the base part 20b of the leg part 20 positioned on the side of the front end of the leg part 20, so as to connect the front end part 20a and the base part 20b in a condition having a gap 20j opened between the middle part 20c and the base part 20b. The bent piece 20e on one side and the bent piece 20e on the other side both are constituted as band-shaped bodies which are bent to project toward the inside surfaces 1e having narrow width of the female member 1.

Accordingly, in the embodiment, the amount of elastic deformation, and the like, of the spring-like part 20d can be uniform on both sides of the leg part 20, that is, on both sides sandwiching the axis center line x of the leg part 20. The place of formation of the spike-like parts can be moved straightly, that is, without bias toward either side, to the other cylinder end or the one cylinder end of the female member 1 by the deformation of the spring-like part 20d and by the movement. Accordingly, it can be made such that no change is caused in the stabbing or piercing state of the spike-like projections 20g into the cord end W.

The property of elastic deformation to the part having the property of elastic deformation in the end cover explained above can be secured easily by making the female member 1 and male member 2 as molded plastic products.

The disclosure of Japanese Patent Application No. 2004-114221, filed on Apr. 8, 2004, is incorporated in the application.

While the invention has been explained with reference to the specific embodiments of the invention, the explanation is illustrative and the invention is limited only by the appended claims.

What is claimed is:

1. A cord end cover for covering an end of a cord, comprising:
   a hollow female member having two open ends, and
   a male member having a leg part to be inserted into the female member from one of the two open ends, and a head part connected to the leg part to be fitted into the one open end for covering the one open end, said leg part having a pair of holding plates for holding the end of the cord in between and at least one projection formed between the holding plates on a side portion thereof along a direction that the leg part is inserted into the female member for biting the end of the cord.

2. A cord end cover according to claim 1, wherein said male member and the female member are arranged such that the projection holds the end of the cord with an inner surface of the female member when the leg part is inserted into the female member in a state in which the at least one projection bites the end of the cord inserted into the female member from the other of the two open ends and drawn out from the one open end.

3. A cord end cover according to claim 1, wherein said at least one projection includes projecting portions disposed on two sides of the leg part, said pair of holding plates extending outwardly from the two sides of the leg part with the projecting portions in between.

4. A cord end cover according to claim 1, wherein said female member includes a rib portion formed, on the inner surface thereof for entering between the pair of holding plates when the leg part is inserted into the female member, said rib portion having a projecting end for holding the end of the cord with the at least one projection.

5. A cord end cover according to claim 4, wherein said projecting end includes an inclined surface with an outward projection gradually increasing toward the other open end.

6. A cord end cover according to claim 1, wherein said leg part includes a spring portion capable of elastically deforming the at least one projection to move away from the head part.

7. A cord end cover according to claim 6, wherein said spring portion is disposed between the at least one projection and the head, said spring portion having two bent pieces curved outwardly to be arranged symmetrically relative to a center line of the leg part, said two bent pieces having upper ends integrated with the at least one projection and lower ends integrated with the head part.

* * * * *